No. 730,298. PATENTED JUNE 9, 1903.
J. RICHI.
SPEED INDICATOR.
APPLICATION FILED SEPT. 23, 1901.
NO MODEL. 2 SHEETS—SHEET 1.

Witnesses  Inventor
  Jakob Richi
  by his Attorney

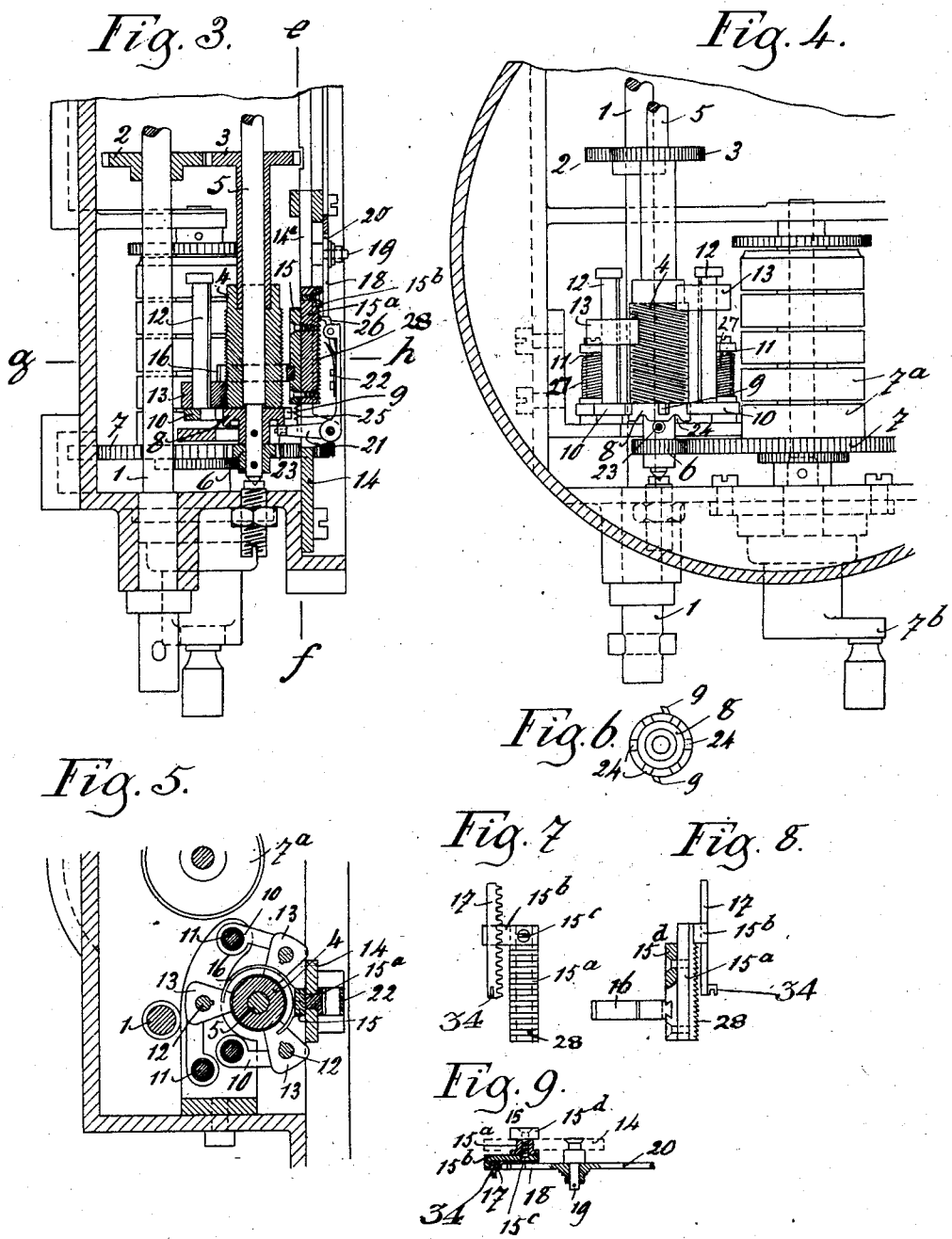

No. 730,298. Patented June 9, 1903.

UNITED STATES PATENT OFFICE.

JAKOB RICHI, OF BERNE, SWITZERLAND.

SPEED-INDICATOR.

SPECIFICATION forming part of Letters Patent No. 730,298, dated June 9, 1903.

Application filed September 23, 1901. Serial No. 76,239. (No model.)

*To all whom it may concern:*

Be it known that I, JAKOB RICHI, a citizen of the Swiss Republic, residing and having my post-office address at Mattenhofstrasse 28, Berne, Switzerland, have invented certain new and useful Improvements in Speed-Indicators, of which the following is a specification.

This invention relates to improvements in speed-indicators.

Owing to the rapid variations in the speed of railway-trains it has become increasingly apparent that the trochometer in common use indicates changes of speed much too late, and therefore does not answer modern requirements.

The object of the present invention is to remove this disadvantage by dispensing with a single falling block which has to revolve with a shaft driven by clockwork, and thus engages and disengages itself with and from the driving mechanism, and to substitute therefor several non-rotatable screw-threaded blocks which are successively raised by a worm driven by the machine the speed of which is to be measured, said blocks acting successively on the indicator or pointer until they are respectively disengaged from the worm by means of a clock-shaft. The disengaging of each block can be accelerated as required by suitably increasing the number of disengaging-cams on the clock-shaft, and the return movement of the indicator is not effected by positive mechanical means, but by counterweighting, so that if a suitable number of blocks are provided an almost instantaneous indication of speed may be obtained, which was not possible with the positive trochometers hitherto in use.

Figure 1:
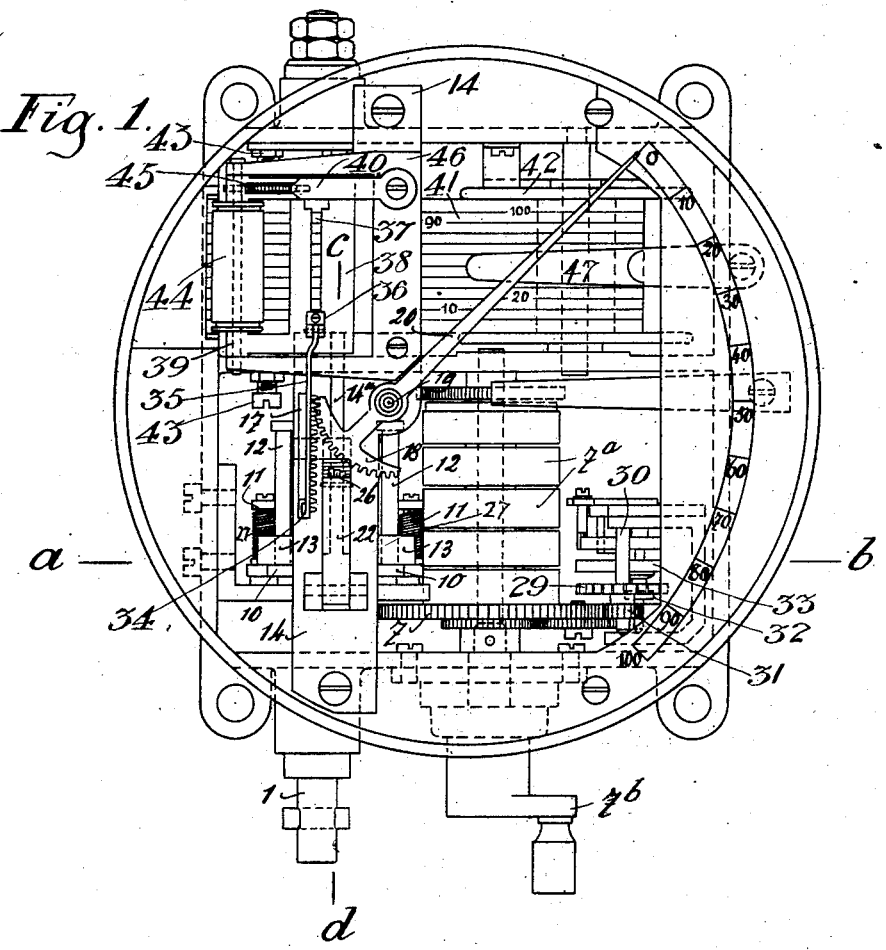
Figure 2:
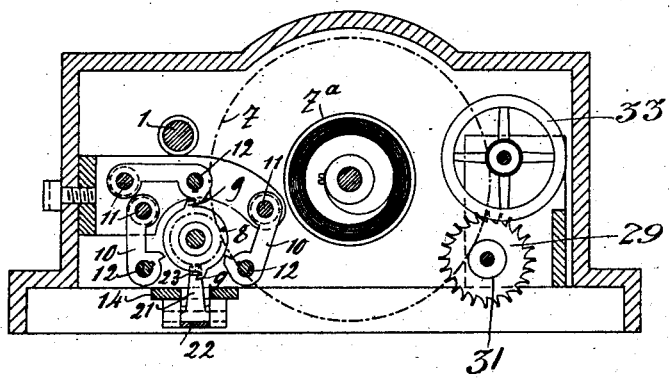

Reference being made to the annexed drawings, Figure 1 is a diagrammatic elevation of the whole apparatus. Fig. 2 is a horizontal section of Fig. 1 on the line $a\ b$; Fig. 3, a vertical section of Fig. 1 on the line $c\ d$, and Fig. 4 a vertical section on the line $e\ f$ of Fig. 3. Fig. 5 is a horizontal cross-section on the line $g\ h$ of Fig. 3, and Figs. 6 to 9 are detail views of parts.

The shaft 1 is driven, for instance, by a locomotive the speed of which is to be optically represented and communicates its movement by means of the gear-wheels 2 and 3 to a rotary worm 4, mounted loosely on a shaft 5, which shaft can be given a uniform rotary movement by means of a clockwork through the gear-wheel 6, fastened on the shaft 5, and the gear-wheel 7 on the shaft of a spring-barrel $7^a$ of a clockwork. $7^b$ is a crank-handle for winding said clockwork.

29 is the escapement-wheel of the clockwork; 32, the escapement-anchor; 33, the escapement balance-wheel; 30, the arbor of the escapement-wheel; 31, a pinion thereon gearing with toothed wheel 7.

Below the worm 4 a disk 8 is fixed to the shaft 5 above the hub of the gear-wheel 6, and the said disk is provided with two cams 9, diametrically opposite each other. The free ends of three levers 10, pivoted on three vertical shafts 11, are adapted to bear against the circumference of the said disk 8, as shown in Fig. 2, under the influence of springs 27, Fig. 4. At the free end of each lever 10 a rod 12 is fixed parallel to the respective shaft 11. The said rod 12 serves as a guide for a sliding block 13, the face of which is provided with part screw-threads, so that when in engagement with the worm 4 it is caused to move upward on said rod 12 by the rotation of the worm 4 at a speed proportionate to that to be measured. When during the rotation of the disk 8 one of the cams 9 passes the end of one of the levers 10, the latter is moved outward and the respective block 13 is disengaged from the worm 4, and consequently is free to fall back to its lowest position.

In front of the worm 4 a slide 15 is guided vertically in a slot $14^a$ of a fixed plate 14, so that it may be reciprocated vertically therein. To the rear of the said slide 15 is fixed a fork or segment 16, Figs. 5 and 8, partially surrounding the worm 4. By means of the said fork or segment 16 the slide 15 can be moved upward by any of the blocks 13. The slide 15 consists of a rear plate $15^d$ and a shouldered sliding plate $15^a$, attached to each other and to the arm $15^b$ by screws $15^c$.

To the arm $15^b$ at the front of the slide 15 a rack 17 is fastened, the teeth of which gear with a toothed segment 18, fixed to one end of an indicator or pointer 20, pivoted at 19 on the plate 14, so that this indicator may show the speed on a scale, as shown in Fig. 1.

Below the slide 15 a bell-crank lever 21 22 is pivoted to the plate 14. The arm 21 of the said lever is provided with a roller 23, over which the under side of the disk 8, in which six radial recesses 24 are provided, can rotate, as shown in Figs. 3 and 4. The said roller 23 is held in continuous contact with the under side of the disk 8 by a spring 25. The other arm 22 of the bell-crank lever is provided with three pawls 26, so set that they can engage at different heights the ratchet-teeth formed on the front face of the part 15ª of slide 15. When the worm 4 rotates, the slide 15, if free, is moved upward by the most advanced of the blocks 13 in proportion to the speed of rotation of the shaft 1, and the indicator or pointer 20 is correspondingly operated by the rack 17 and toothed segment 18, being prevented from falling down when the block falls by the action of the pawls 26, engaging the ratchet-teeth 28.

After each semirevolution of the clockwork-driven shaft 5 the respective block 13 is disengaged from the worm 4 by means of one of the cams 9 on the disk 8 and falls back to its lowest position. Immediately before the descent of the said block the roller 23 enters one of the recesses 24. This causes the pawls 26 to become disengaged from the teeth 28, so that if the indicator 20 had been raised to a higher point by the previous block, owing to the speed having been greater at that time, it can now fall immediately before the block next about to drop reaches the highest position it will attain, so that the indicator is not allowed to drop unnecessarily far. When released, the slide 15, with its fork or segment 16, will drop until it meets the highest block 13. Consequently it is advisable to delay this movement until the said block is nearly at the highest point it will reach.

Fig. 1 also illustrates mechanism for making a record of the speed upon a paper strip. On the rack 17 a hook 34 is fastened, Fig. 8, in which one end of the rod 35 is hooked. The other end of the rod 35 carries a clamp 36 for a pencil. (Not visible on the drawing.) The clamp 36 is guided in a slot 37 in a plate 38, which is hinged on a vertical rod 39 and pressed rearward by a spring 40. Behind the plate 38 is a paper strip 41, which is carried by a spool 42 and is wound off between two rollers, one of which is shown at 44, mounted to rotate on rod 39, while the other (not visible in the drawing) is behind and turns between two pin-bearings 43 43. On this roller the paper strip is wound by the action of the clockwork through wheel 45 and other intermediate gear. (Not shown, since it forms no part of the present invention.) The rod 39 is carried by the frame 46. The spring 47, bearing on the surface of the paper strip on the spool 42, gives a friction which keeps the paper strip taut.

What I claim is, in a speed-indicator—

1. The combination with a shaft driven by a machine the speed of which is to be indicated, of a worm operated by said shaft, a plurality of non-rotatable part-screw-threaded blocks adapted to mesh with said worm and to be raised thereby, means for guiding said blocks, an indicator, mechanism operated by said blocks for actuating said indicator, time-operated mechanism for engaging and disengaging said blocks successively with and from the worm, and means for locking and for momentarily releasing said indicator mechanism at intervals for the purpose set forth.

2. The combination with a shaft driven by a machine the speed of which is to be indicated, of a worm operated by said shaft, a plurality of non-rotatable part-screw-threaded blocks adapted to mesh with said worm and to be raised thereby, means for guiding said blocks, an indicator, a slide adapted to be raised by said blocks, a rack on said slide adapted to operate the indicator, time-operated mechanism for engaging and disengaging said blocks successively with and from the worm and means for locking and momentarily releasing said slide for the purpose set forth.

3. The combination with a shaft driven by a machine, the speed of which is to be indicated, of a worm operated by said shaft, a plurality of non-rotatable part-screw-threaded blocks adapted to mesh with said worm and to be raised thereby, guide-rods carrying said blocks, a slide adapted to be raised by said blocks, an indicator, a rack on said slide adapted to operate the indicator, a disk mounted on a time-driven shaft and provided with a plurality of cams, a plurality of levers connected to said guide-rods respectively and adapted to be displaced by said cams for the engagement and disengagement of the blocks successively with and from the worm, and means for locking and momentarily releasing said slide for the purpose set forth.

4. The combination of a shaft driven by a machine, the speed of which is to be indicated, a worm operated by said shaft, a plurality of non-rotatable part-screw-threaded blocks adapted to mesh with said worm and to be raised thereby, guide-rods carrying said blocks, a slide adapted to be raised by said blocks, an indicator having a segment, a rack on said slide adapted to operate the segment on the indicator, a recessed disk mounted on a clockwork-driven shaft and provided with a plurality of cams, a plurality of levers connected to said guide-rods respectively and adapted to be displaced by said cams, a ratchet-bar also on said slide, a bell-crank lever, pawls on one arm of said bell-crank lever adapted to engage said ratchet-bar and a roller on the other arm thereof adapted to enter the recesses of the before-mentioned disk for the purpose set forth.

In witness whereof I have signed this specification in the presence of two witnesses.

JAKOB RICHI.

Witnesses:
M. HANSLIN,
C. HANSLIN.